United States Patent [19]
Curtis

[11] Patent Number: 5,626,513
[45] Date of Patent: May 6, 1997

[54] CLAMPING DEVICE DURING SKINNING OF A FISH

[76] Inventor: James L. Curtis, 44247 12th St. East, Lancaster, Calif. 93535

[21] Appl. No.: 586,578

[22] Filed: Jan. 16, 1996

[51] Int. Cl.$^6$ ............................................. A22C 25/17
[52] U.S. Cl. .................... 452/125; 452/128; 452/185; 452/198; 81/307; 81/418
[58] Field of Search ....................... 452/125, 185, 452/196, 132, 128, 198; 81/303, 304, 305, 306, 307, 308, 310, 418, 419, 426, 415, 416

[56] References Cited

U.S. PATENT DOCUMENTS

| | | | |
|---|---|---|---|
| 790,411 | 5/1905 | Watrous | 81/418 |
| 1,022,489 | 4/1912 | Lyons | 81/415 |
| 2,220,317 | 11/1940 | Cynoske | 81/426 |
| 2,785,436 | 3/1957 | Noland et al. | 452/185 |
| 2,948,171 | 8/1960 | Lucibello | 81/418 |
| 3,088,165 | 5/1963 | Bellis | 452/132 |
| 3,314,320 | 4/1967 | Early | 81/419 |
| 3,675,359 | 7/1972 | Ohno | 81/415 |
| 4,069,551 | 1/1978 | Van Dyke et al. | 452/132 |
| 4,306,336 | 12/1981 | Kovar | 452/196 |
| 4,787,109 | 11/1988 | Bennett et al. | 452/185 |

FOREIGN PATENT DOCUMENTS

| | | | |
|---|---|---|---|
| 605774 | 11/1934 | Germany | 452/196 |

*Primary Examiner*—Willis Little
*Attorney, Agent, or Firm*—Frank L. Zugelter

[57] ABSTRACT

A tool 15 for clamping and hand holding of a head 16 of a fish 17 while its body 19 is skinned. A pair of handles 21, 22 in tool 15 are manually manipulated to provide a pivotal action for prongs 31, 32 mounted on extensions members 25, 26, respectively, to the handles 21, 22, piercing the head 16. The single prong 32 and the prongs 31 grip the head 16 while skinning of the fish's body 17 proceeds after cutting a line 46 behind its head 16. Bosses 37, 38 are provided in the handles 21, 22, respectively, engaging one another in a full closure mode for the tool 15. A pocket 40 is provided in handle 22 for seating of a portion 39 of handle 21 adjacent a pivotal assembly 23 for handles, extensions, and prongs, the bosses 37, 38 in alignment with one another for cooperative engagement to limit pivotal action of the tool 15 to its closed mode.

12 Claims, 2 Drawing Sheets

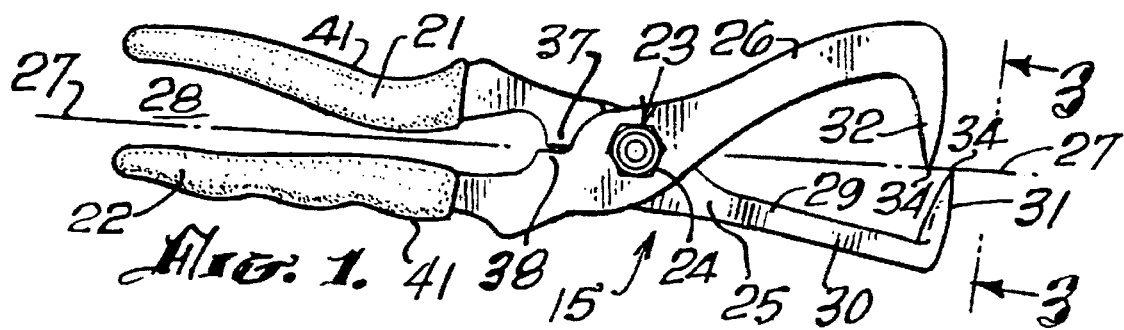
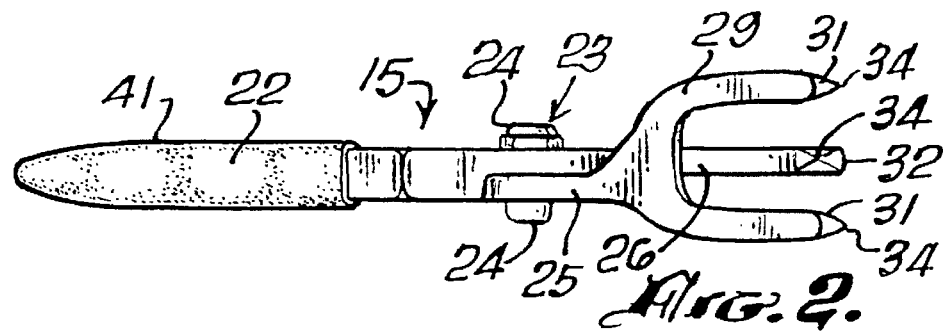
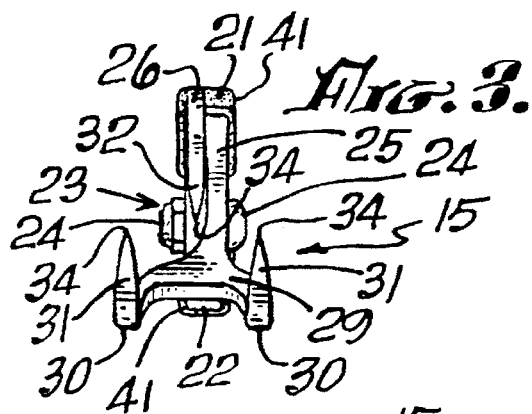
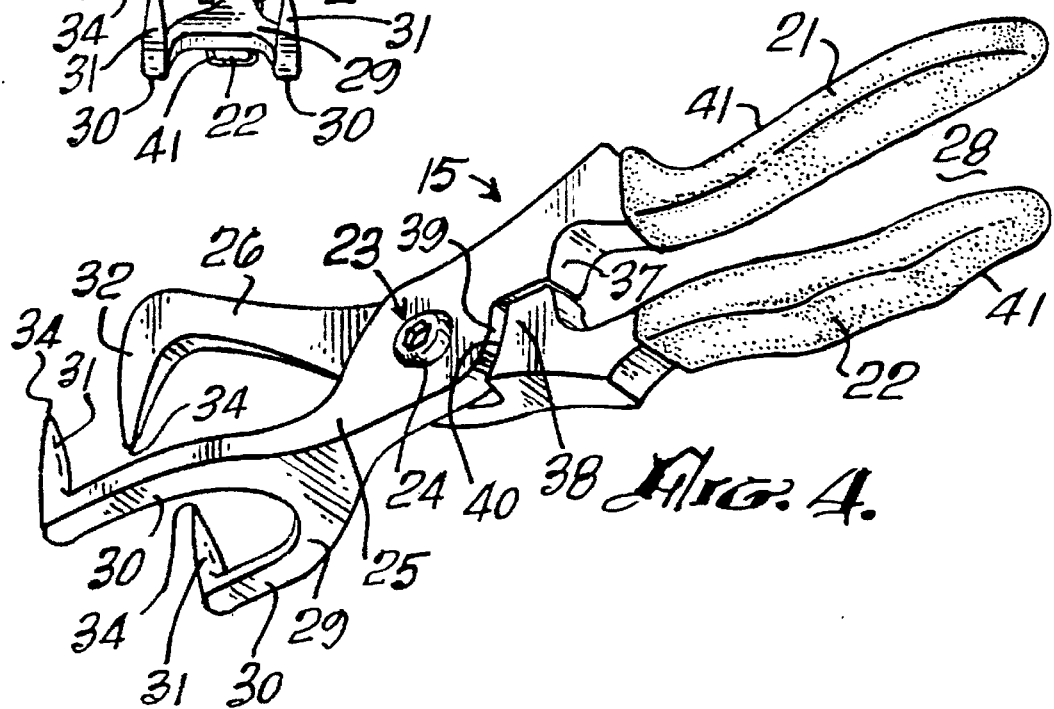

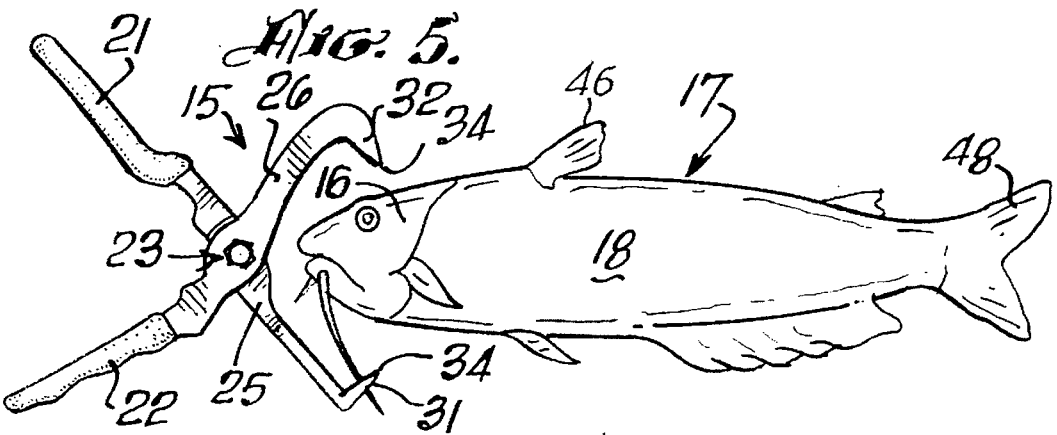
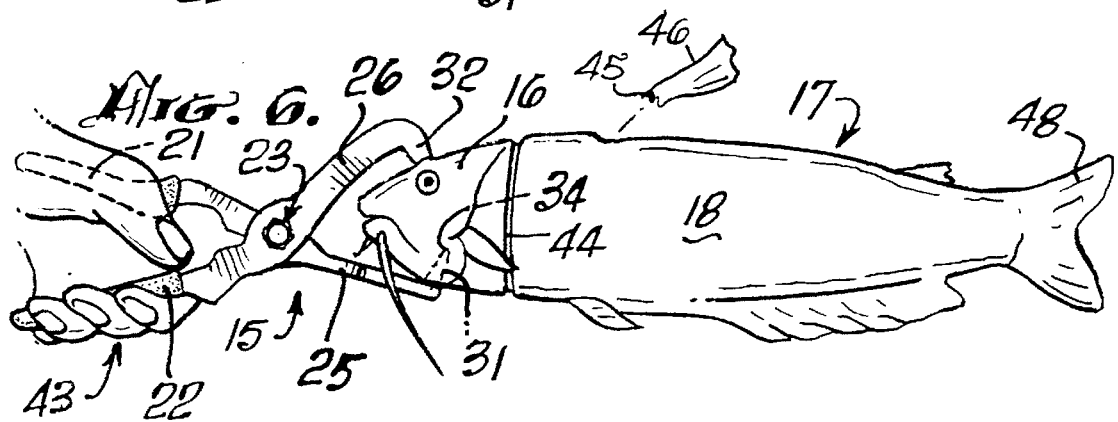
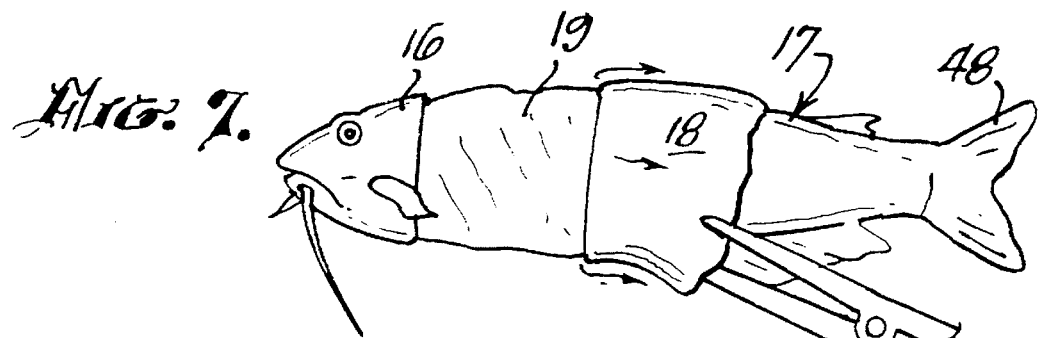
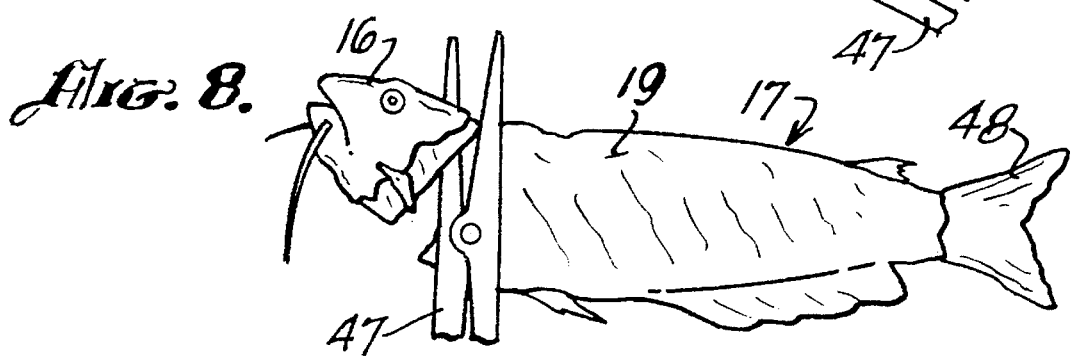

CLAMPING DEVICE DURING SKINNING OF A FISH

TECHNICAL FIELD

This invention relates to skinning of fish and particularly is directed to a novel hand-held device that clamps or grips the head of a catfish or the like while skinning its body.

BACKGROUND OF THE INVENTION

The gripping of a fish's head by means of jaws through pivotal action of a pair of handles to which the jaws are mounted is old, as taught by the disclosure in U.S. Pat. No. 2,603,829, granted Jul. 22, 1952 to Siskoff. The disclosure in the U.S. Pat. No. 2,932,849, granted Apr. 19, 1960 to Missman teaches that it is old to mount a sharpened point on a rod so that the rod can be forced throughout the body of a fish to support it in an upright position on a board while it is being skinned. The disclosure in U.S. Pat. No. 4,787,109 granted Nov. 29, 1988 to Bennett et al introduces the concept of teeth mounted on flat, solid, rectangularly shaped bills to grip the head of a fish while skinning it. None of these teachings, singly or in combination, teach or suggest the concept of a bifurcated member having prongs thereon and which cooperate with a single prong on another member located between the prongs on the bifurcated member, the members and prongs functioning by pivotal actuation of a pair of handles. Nor is there a teaching or suggestion of a pair of bosses on handles that engage one another in the closure mode for the tool and which prevent the prongs from further thrust into the fish's head, the prongs in such closed mode having grasped the fish sufficiently for its skinning thereafter. Further, a portion of the pivotal assembly in the tool fits neatly in a pocket provided in the tool and by which the bosses on the handles are in alignment with one another for cooperative action in the operation of the subject matter of the invention; this also not taught or suggested in the noted teachings.

Other state-of-the-art disclosures may be found in U.S. Pat. No. 2,720,001, granted Oct. 11, 1995 to Hobson; U.S. Pat. No. 4,306,336 granted Dec. 22, 1981 to Kovar; and U.S. Pat. No. 4,710,998 granted Dec. 8, 1987 to Gast.

SUMMARY OF THE INVENTION

The subject matter of the invention is a hand-held tool for clamping or gripping a fishhead through the action of a pair of handles pivotally connected to each other, the handles extending forwardly of such connection to form corresponding extension members, on one of which a bifurcated or yoke member is mounted and on which arms are further mounted for supporting corresponding prongs directed towards a single prong mounted directly on a second extension member extending from the other of the pair of handles. The two griping elements and the single gripping element extend in directions towards a common plane for them, with the location of the single gripping element disposed between the gripping elements connected to the bifurcated member. The gripping elements take pointed or sharpened form, for ease of forcing them into the fish's head in the pivotal action of the handles, after which the skinning process begins. In such pivotal action the ends of the prongs meet or pass through, in opposing directions to one another, a common plane extending through the pivotal assembly for the handles and extension arms and a spatial area disposed between the handles. Bosses are provided on the handles, facing one another for engagement, to prevent the handles from engaging each other in closed mode of the tool, nevertheless not impairing the ability of the prongs to meet or pass through the plane common to the pivotal assembly.

An object of this invention is to provide a novel clamping or gripping tool to be hand-held while skinning a fish.

Another object of this invention is to provide a light-weight and inexpensive fish clamping tool.

A further object of the invention is to provide for an efficient holding or grasping and manipulation of the head of a fish while skinning its body.

These and other objects of the invention will become more apparent by a full and complete reading of the following description, the appended claims thereto, and the accompanying drawing comprising two (2) sheets of eight (8) FIGURES.

BRIEF DESCRIPTION OF THE DRAWING

FIG. 1 is an elevational view of the tool of the invention.

FIG. 2 is a plan view of the tool of the invention.

FIG. 3 is a frontal view taken on line 3—3 of FIG. 1.

FIG. 4 is a perspective view of the tool of the invention, taken from its underside, rear and right side.

FIGS. 5–8 illustrate use of the tool of FIGS. 1–4 while a fish is being skinned.

BEST MODE OF CARRYING OUT THE INVENTION

Referring now to the drawing wherein reference characters therein refer to like numerals hereinafter, a hand-holdable tool 15 for clamping or gripping the head 16 of a fish 17, FIGS. 5–8, while removing the skin 18 from its body 19, is illustrated in FIG. 1 in accordance with the invention. Tool 15 comprises a pair of handles 21, 22 joined together by a pivotal assembly 23, FIG. 1, illustrated by the nut-and-bolt 24 arrangement, FIG. 4, generally midway the length of tool 15, and by which the handles 21, 22 open and close in operation of the tool 15. Integrally mounted to each of the handles 21, 22 is an extension member 25, 26, respectively, to the other side of the pivotal assembly 23. Each extension member 25, 26 crosses over from its own handle a plane 27 that extends through the pivotal assembly 23 and through a spatial area 28 between the handles 21, 22, so as to lay to the same side of the plane 27 as does the other handle of the tool.

Each extension member 25, 26 extends forwardly towards the end of the tool distal from the handles ends, and while doing so their lengths in traversing to their respective ends extend transversely away from the plane 27. Extension member 25 comprises a bifurcated member 29 having at least a pair of arms 30 to each of which a prong 31 is mounted, the prong 31 extending back towards plane 27. A prong 32 is mounted directly on the other extension member 26, likewise projecting back towards the plane 27. Prong 32 is disposed generally midway of or in a plane disposed between the plurality of prongs 31 in the design of the tool 15. The ends 34 of the prongs 31, 32 are sharpened to facilitate forcing them into the head 16 of the fish 17 as it is being prepared for a skinning process. The end 34 of the single prong 32 meets the plane 27 at a point farther from the pivotal assembly 23 than the ends 34 on the prongs 31, FIG. 1.

Each of the handles 21, 22 includes a boss 37, 38, for engaging each other in a full closed mode for the tool 15, and thereby stop further or limit the pivotal action of tool 15 to a full closure for the handles. The bosses 37, 38, are positioned or formed in the handles 21, 22 at a location adjacent to the pivotal assembly 23, so as to provide a reasonable range of actuation for the handles 21, 22, prior to the full closed mode for the tool 15 in its operation.

The boss 38 on handle 22 projects laterally therefrom, and a pocket 40 is provided in handle 22 forwardly thereof and adjacent the pivotal assembly 23. The portion 39 of handle 21 about the pivotal assembly 23 seats in the pocket 40 in the assembling of the tool's elements, best observed in FIG. 4. In the assembling of tool 15, the bosses 37, 38 become aligned and in cooperative relationship with each other, and the boss 37 in handle 21 directly engages the boss 38 in the actuation of the handles to their full closed mode.

As the bosses 37, 38 engage one another in the full closed mode of the tool, it is to be noted that the ends 34 of the prongs 31, 32 meet or project through their common plane 27 i.e., the prongs 31, 32 project past the plane 27 in their respective directions of motion that extends to such engagement.

The handles 21, 22 are provided with gloves 41 shrunken thereto, and which facilitate the holding of the handles by the person who intends to skin the fish 17, FIG. 5–8.

In the use of the subject matter of the invention, taking a catfish as an example of fish 37, the tool 15 is put into an open mode for operation, FIG. 5, i.e., the prongs 31, 32 are disposed farthest from their common plane 27 by maneuvering handles 21, 22 to effect such disposition for the prongs 31, 32. The fish's head 16 is positioned within the confines of the opening provided by such disposition of the prongs 31, 32, after which the handles 21, 22 are actuated, FIG. 6, towards one another by a hand 43 of the person or skinner intending to skin the fish 17. The prongs 31, 32 are manually forced into the head 16 by the handles actuation, the skinner thereby gaining a firm grip or clamp upon the fish 17. Preferably, as shown, the fish 17 is in an upright position for application of the prongs 31, 32 of the tool 15 to its head 16, FIGS. 5 and 6. Thereafter, the skinner uses known techniques to cut, as at 44, behind the head 16, the skin 18 of fish 17, and at other locations that produce severance of undesired fish portions, such as illustrated at 45, FIG. 6, the line that severs the fish's dorsal fin 46 from its body 19, and which techniques produce an ease of removal of such skin and undesireable fish portions. A pliers 47, held by the skinner's second hand (not shown), grabs hold of the cut skin and pulls it rearwardly towards the tail 48 of the fish 17, as illustrated in FIG. 7, to a point where it and the tail 48 may be subsequently removed from the body 19 of the fish. Pliers 47 snips off the head 16 as well, and is thereafter properly disposed of, with its tail 48, after detachment from the prongs 31, 32 of the tool 15. The tool 15 is immediately ready for use again on another fish 17.

In assembling tool 15, after the handles, extensions, and prongs are fabricated in their respective components, the portion 39 of handle 21 is positioned in pocket 40 of handle 22, abutting the laterally projecting boss 38, after which a suitable threaded bolt is mounted through bores (not culled out in the drawing) formed in such components and a nut threaded thereto, so as to produce the nut-and-bolt assembly 24 that retains such components together for operation of the subject matter of the invention. Gloves 41 may be shrunkenly fit to the handles 21, 22, before or after assembly 24 is mounted in place.

Suitable materials, such as metal or plastic, may be used to fabricate in an integral manner the handles 21, 22, extensions 25, 26, and prongs 31, 32. The gloves 41 are preferably formed of plastic, roughened to provide gripping strength. The metal may be cast or machine cut, as desired. Suitable and known nut and bolt products complete the inventory of elements for tool 15.

Various changes and modifications can be made in the subject matter of the invention without varying from the scope or spirit of the invention or its inventive concept.

I claim:

1. In a tool that is hand-held during the process of skinning a catfish or the like, and said tool including a pair of handles mounted to one another in a pivotal assembly, crossing over each other, and an extension member integrally mounted on each of said handles and which crosses over the other of said handles past beyond said pivotal assembly, the improvement comprising each said extension member in the tool extending forwardly of said handles an in a direction away from a plane passing through said pivotal assembly and laterally through a spatial area disposed between said handles in their closed mode, a first said extension member including a bifurcated yoke positioned on the side of the plane passing through the pivotal assembly opposite of the other of said pair of handles on the other side of such plane, said yoke having separate arms extending therefrom and first prong means extending towards the plane mounted on each of said arms, a second said extension member including a single prong means also extending towards the plane, and boss means mounted in alignment on said handles for engaging one another to stop further closing between said handles in the step of said first and second prong means gripping the catfish or the like during the skinning thereof.

2. In the improvement of claim 1, the first of said boss means extending laterally from a first of said handles in a direction paralleling the plane, the second of said boss means mounted on a second of said handles for engaging the first of said boss means in the closure mode between said handles.

3. In the improvement of claim 2, said single second prong means disposed in a plane between said first prong means mounted on said arms of said bifurcated yoke.

4. In the improvement of claim 3, said single prong means mounted on the extension member of the first of said handles.

5. In the improvement of claim 4, said first prong means mounted on said arms of said bifurcated yoke having ends that meet or exceed the disposition of the plane when said handles are in closed mode.

6. In the improvement of claim 1 or claim 2 or claim 3 or claim 4 or claim 5, a pocket formed forwardly of said laterally extending boss means in the second of said handles, and a portion of the pivotal assembly mounted between the boss means and bifurcated yoke in the first of said handles seated in such pocket, the boss means in the second of said handles and the laterally extending boss means in the first of said handles in cooperative relationship to each other thereby.

7. A tool that is hand-held during the process of skinning a catfish or the like and comprising a pair of handles mounted to one another in a pivotal assembly, an extension member integrally mounted on each of said handles and which crosses over the other of said handles past said pivotal assembly, each said extension member in the tool extending forwardly of said handles and in a direction away from a first plane passing through said pivotal assembly and laterally through a spatial area disposed between said handles in their closed mode, a first said extension member including a bifurcated yoke having arms thereon and prong means mounted on each of said arms and extending towards the plane, a second said extension member including a single prong means also extending towards the plane, and boss means mounted on said handles for engaging one another to stop further closing between said handles in the step of said prong means gripping the catfish or the like during the skinning thereof.

8. The tool of claim 7, wherein the first of said boss means extends laterally from a first of said handles in a direction paralleling the plane, the second of said boss means mounted on the second of said handles for engaging the first of said boss means in the closure mode between said handles.

9. The tool of claim 8, wherein said single prong means is disposed in a second plane between said prong means.

10. The tool of claim 9, wherein said single prong means is mounted on the extension member of the first of said handles.

11. The tool of claim 10, wherein said prong means have ends that meet or exceed the disposition of the first plane when said handles are in closed mode.

12. The tool of claim 7 or claim 8 or claim 9 or claim 10 or claim 11, wherein a pocket is formed forwardly of said laterally extending boss in the second of said handles, and a portion of the pivotal assembly is mounted between the boss and bifurcated yoke in the first of said handles seated in such pocket, the boss in the second of said handles and the laterally extending boss in the first of said handles being in cooperative relationship to each other thereby.

* * * * *

UNITED STATES PATENT AND TRADEMARK OFFICE
CERTIFICATE OF CORRECTION

PATENT NO.  : 5,626,513
DATED       : May 6, 1997
INVENTOR(S) : James L. Curtis

It is certified that error appears in the above-indentified patent and that said Letters Patent is hereby corrected as shown below:

In col. 6, line 3, read -- disposed -- before "between".

Signed and Sealed this

Eleventh Day of November, 1997

Attest:

BRUCE LEHMAN

Attesting Officer

Commissioner of Patents and Trademarks